Aug. 6, 1935.                M. CANTER                2,010,583
                              FUR SEAL
                         Filed April 3, 1933
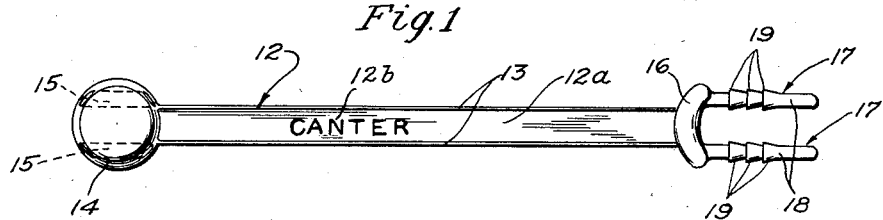
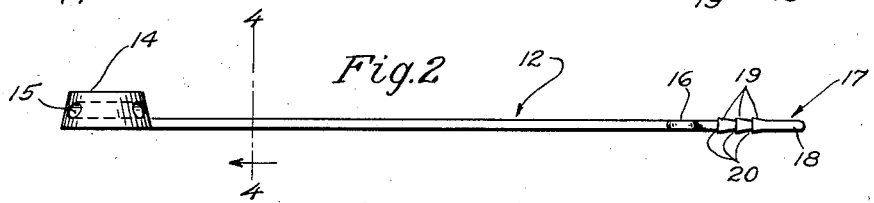
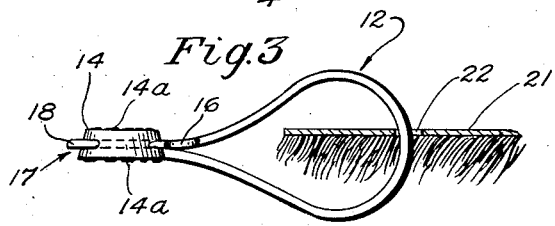
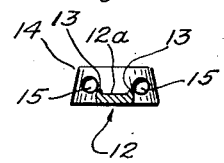
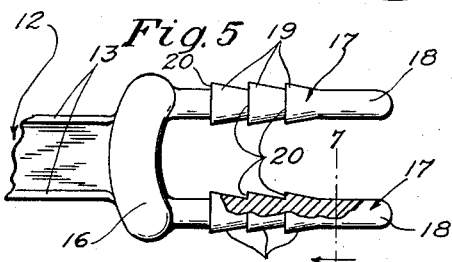
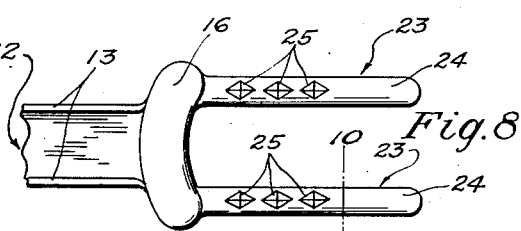
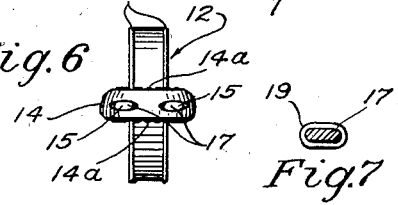
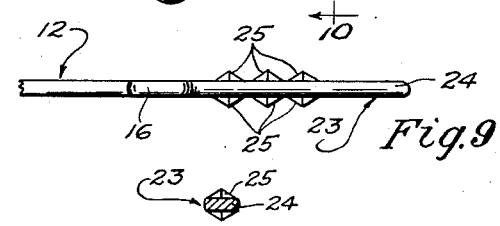
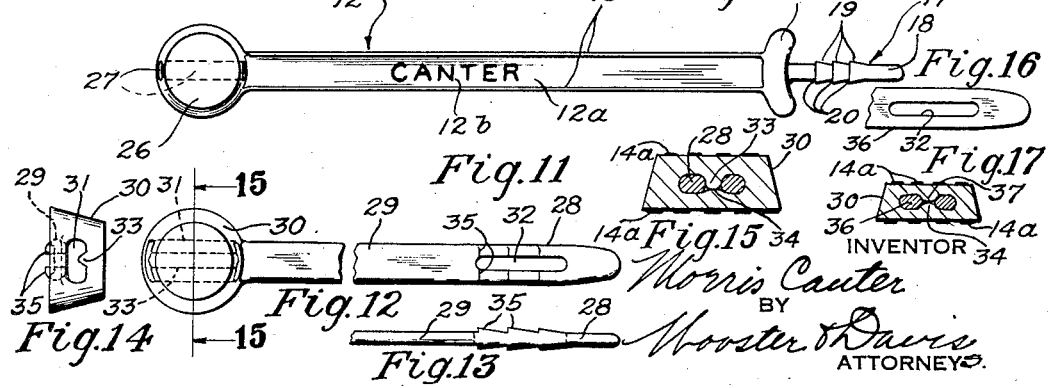
INVENTOR
Morris Canter
BY
Wooster & Davis
ATTORNEYS.

Patented Aug. 6, 1935

2,010,583

UNITED STATES PATENT OFFICE 2,010,583

FUR SEAL

Morris Canter, Brooklyn, N. Y.

Application April 3, 1933, Serial No. 664,061

5 Claims. (Cl. 292—308)

This invention relates to new and useful improvements in seals and has particular relation to seals such as are used for identifying furs and the like whereby to insure the return of the proper furs from the plant of the fur dresser, dyer or the like.

An object of the invention is to provide a seal of economical construction and which when in place or when sealed on or to a fur cannot be removed and replaced on another skin without clearly showing that it has been tampered with.

Another object is to provide a seal of the type indicated and which includes an improved sealing or locking feature whereby the seal must be cut or destroyed to remove it from a fur skin or other article to which it has been applied.

Other objects and advantages will become apparent from a consideration of the following detailed description taken in connection with the accompanying drawing wherein satisfactory embodiments of the invention are shown. However, it will be understood that the invention is not limited to the details disclosed but includes all such variations and modifications as fall within the spirt of the invention and the scope of the appended claims.

In the drawing:

Fig. 1 is a plan view showing a seal constructed according to the present invention;

Fig. 2 is a side elevational view thereof;

Fig. 3 is a similar view, the seal being attached to a fur bearing skin and closed;

Fig. 4 is a sectional view taken substantially along the line 4—4 of Fig. 2;

Fig. 5 is an enlarged plan view of the pronged end of the seal, a portion of one prong being broken away;

Fig. 6 is an elevational view showing the seal when closed, the view being taken as when looking from the left in Fig. 3;

Fig. 7 is a detail sectional view taken substantially along the line 7—7 of Fig. 5;

Fig. 8 is a view similar to Fig. 5 but showing a slightly modified construction;

Fig. 9 is an edge view of Fig. 8;

Fig. 10 is a detail sectional view taken substantially along the line 10—10 of Fig. 8;

Fig. 11 is a top plan view showing a slightly modified construction of seal;

Fig. 12 is a top plan view showing a modified construction;

Fig. 13 is a side elevation of the free end of the prong or shank of Fig. 12;

Fig. 14 is an end elevation looking from the left of Fig. 12;

Fig. 15 is a section of the head on an enlarged scale after being compressed in dies to set the seal, the plane of the section being indicated by line 15—15 of Fig. 12;

Fig. 16 is a plan view of a modified construction of the end or shank; and

Fig. 17 is a section through a head after it has been compressed to secure this shank therein.

Referring in detail to the drawing and at first particularly to Figs. 1 through 7, the improved seal is shown as comprising a body 12 formed of a suitable length of soft bendable metal, as for example an alloy of lead and tin of approximately 40% lead and 60% tin, but of course, other alloys or proportions may be used. Preferably, the body 12 is somewhat channel shaped in transverse section including a pair of ribs or flanges 13 and certain insignia, such as the name of the owner, may be placed by means of depressed or raised letters on the surface of the bottom wall 12a as indicated at 12b. Carried by one end of body 12 is an enlargement or head 14 which while shown as circular may be of any desired configuration. This head 14 is preferably cast integral with the body and is of relatively soft crushable material. Extending entirely through the head are a pair of spaced parallel transversely circular openings 15 although as the description proceeds it will be apparent that it is not absolutely necessary that these openings extend entirely through the body.

At its end opposite that carrying the head 14 the body 12 is provided with an arcuate enlargement 16 from which extends a pair of prongs 17 the said prongs being arranged in spaced parallel relation and at substantially the same distance apart as are the openings 15 in the head. These prongs 17 may be of the same or different lengths and may enter into or extend entirely through the openings 15 as is preferred when the seal is closed. As here disclosed, the prongs are of the same length and each is of a length to extend entirely through one of the openings 15. The forward or outer end portion 18 of each prong is shown as being smooth and each prong is somewhat flattened and is non-circular in transverse section as clearly shown in Fig. 7.

Inwardly of its smooth outer end portion 18 each prong 17 is provided with or includes a plurality of successive enlargements 19, preferably extending entirely about the prongs and each having a tapered forward side terminating in an abrupt shoulder 20 (see Fig. 5) forming its inner side or wall. In the use of the device a fur bearing skin 21, or other object to which the seal is to be applied is provided with a perforation or opening 22 and either the pronged or the headed end of the seal is passed through this opening and the seal is then bent upon itself, forming a loop, and the prongs 17 are inserted into or through the openings 15 of the head 14 beyond one edge of the article 21, it being understood that the opening 22 is formed adjacent said edge.

The prongs 17 enter the openings 15 at least to the extent necessary to carry one or more of the enlargements 19 into said openings. With the parts of the seal so positioned the head may now be engaged by a punch to compress or crush the head against a suitable die or the like. This action will result in a flattening or pressing together of the head and the openings 15 onto the prongs 17 to the condition best shown in Fig. 6. As the head is compressed portions of the material of the head are forced inwardly at the rear side of the abrupt shoulders 20 of the enlargements 19 whereby the head and the enlargements interlock so that the prongs cannot be pulled out of the head. When the enlargement 16 is brought up against the head prior to the compressing of the head there will be no portion of a prong exposed at the inner side of the head in position to be severed and then soldered together again in a manner not to show such surreptitious action. The punch and die may be provided with markings such as a seal or the owner's name so that when the head is compressed between them this seal or name is impressed in the top and bottom surfaces of the head or formed in raised letters as indicated at 14a.

Further, the body 12 between the ribs or flanges 13 may have a name or other matter impressed thereon by suitable die or in the casting operation. Such matter together with the ribs or flanges 13 will make it practically impossible to sever the body and then solder it together in a manner to avoid detection.

Figs. 8, 9, and 10 show a slightly modified construction in which the prongs are generally designated 23 and include smooth outer end portions 24. These prongs as shown in Fig. 10 are substantially rectangular in cross section and inwardly of its end portion each prong on each of its upper and lower surfaces carries a row of projections 25 of any suitable shape. As disclosed, projections 25 are somewhat diamond shaped and when the prongs have been inserted into a head so as to have the projections carried into the head, the said head may be compressed as by a punch against a die and the head will then interlock with the projections 25 to prevent withdrawal of the prongs from the head. From this it will be seen that substantially any irregularities in the surfaces of the prongs may be used to interlock with the material of the head to prevent withdrawal of the prongs from the head when the latter has been compressed or sealed onto the prongs.

Fig. 11 shows a further slight modification wherein the body 12 carries a head 26 having a single opening 27 therethrough arranged substantially in alignment with the body. At its opposite end the body is provided with an enlargement 16 carrying one of the above described prongs 17 having the enlargements 19. This prong is in alignment with the body 12 and the body is adapted to be bent to have the prong 17 inserted into the opening 21 after which the head may be compressed to interlock with the abrupt shoulders 20 of the enlargements 19 as above explained.

Figs. 12 to 15 show another modification. In this form the end or prong 28 is of substantially the same width as the shank or body 29 and the head 30 has an opening 31 therethrough of sufficient width to receive this prong. The prong has an elongated eye or opening 32 therein and one wall of the opening 31 in the head is provided with a rib 33. Thus when the prong 28 is inserted in the opening 31 the same as indicated in Fig. 3 for that form, and the head compressed by the dies the rib 33 will be forced down into the eye 32 as indicated in Fig. 15. Also a part of the lower wall of the head will be forced up into the lower part of the eye as indicated at 34, Fig. 15. It will thus be evident as the rib 33 and metal 34 is forced into the eye and usually fills it that the prong will be securely anchored in the head. The prong may have ribs or projections 35 to correspond with the ribs and projections 19 and 25 of the other forms if desired to lock in the head in the same manner. These ribs or projections may or may not be used with the eye construction 32 as desired, but when they are used they provide an additional locking or anchoring means.

In Figs. 16 and 17 is shown a prong 36 similar to prong 28 and having the elongated eye 32. It, however, is formed without the ribs 35. In either the form of Fig. 12 or that of Fig. 16 the rib 33 in the head 30 may be omitted. In this case when the head is compressed in the dies to secure the prongs, the metal of the upper and lower walls of the head is forced into the eye as indicated at 34 and 37, Fig. 17 to anchor the prong in the head.

Having thus set forth the nature of my invention, what I claim is:

1. In a seal, a body comprising a length of bendable metal, a head at one end of said body, an enlargement at the other end of said body, a prong extending from one side of said enlargement and of less diameter than said enlargement, said head having an opening therein into which said prong may be inserted on bending of said body upon itself, said enlargement on its prong side shaped to conform to the exterior configuration of the head portion about said opening, said prong adapted to be entirely inserted into said opening to bring said side of the enlargement against the head, and said head being of soft material whereby it may be compressed against said prong when the latter is in the opening in the head.

2. A one piece seal comprising a casting of soft metal including a head, a prong and an elongated body connecting the head and prong, and said head having an opening therein to receive the prong on bending of the body upon itself after which the head may be compressed on the prong.

3. A seal comprising a single piece of soft metal including a head, an enlargement, an elongated body connecting the head and enlargement and a pair of prongs extending from said enlargement at the side thereof opposite the body and arranged in spaced relation and laterally of the longitudinal edges of the body, and said head having a pair of openings spaced to receive the prongs on bending of the body upon itself after which the head may be compressed against the prongs.

4. In a seal, a body comprising a length of bendable metal, a head at one end of said body, an enlargement at the other end of the body and extending laterally beyond the longitudinal edges thereof, a pair of prongs extending from the enlargement at the side thereof opposite the body and arranged in spaced relation and laterally of the longitudinal edges of the body, said head having a pair of spaced openings to receive said prongs and permit said enlargement to be brought against the head on bending of said body upon itself after which the head may be compressed against the prongs.

5. A one piece seal comprising a casting of soft metal including a head, a prong and an elongated body connecting the head and prong, said head having an opening therein to receive the prong on bending of the body upon itself after which the head may be compressed on the prong, and said prong having an irregular surface against which the head is compressed whereby the prong and head interlock and may not be separated.

MORRIS CANTER.